(12) United States Patent
Tabata

(10) Patent No.: US 10,104,350 B2
(45) Date of Patent: Oct. 16, 2018

(54) IMAGE DISPLAY DEVICE AND IMAGE DISPLAY METHOD

(71) Applicant: JVC KENWOOD Corporation, Yokohama-shi, Kanagawa (JP)

(72) Inventor: Kiyofumi Tabata, Yokohama (JP)

(73) Assignee: JVC KENWOOD Corporation, Yokohama-Shi, Kanagawa (JP)

(*) Notice: Subject to any disclaimer, the term of this patent is extended or adjusted under 35 U.S.C. 154(b) by 196 days.

(21) Appl. No.: 15/240,948

(22) Filed: Aug. 18, 2016

(65) Prior Publication Data

US 2016/0360170 A1  Dec. 8, 2016

Related U.S. Application Data

(63) Continuation of application No. PCT/JP2014/005432, filed on Oct. 28, 2014.

(30) Foreign Application Priority Data

Feb. 20, 2014  (JP) .................... 2014-030126

(51) Int. Cl.
H04N 9/31 (2006.01)
G02B 26/10 (2006.01)

(52) U.S. Cl.
CPC ......... *H04N 9/3185* (2013.01); *G02B 26/101* (2013.01); *G02B 26/105* (2013.01);
(Continued)

(58) Field of Classification Search
CPC .. H04N 9/3185; H04N 9/3135; H04N 9/3129; H04N 9/3161; G02B 26/101; G02B 26/105
(Continued)

(56) References Cited

U.S. PATENT DOCUMENTS 5,253,085 A * 10/1993 Maruo ................. G02B 26/122
                                                    358/481
5,646,765 A *  7/1997 Laakmann ........... G02B 26/101
                                                    250/234

(Continued)

FOREIGN PATENT DOCUMENTS

JP    2000-081589    3/2000
JP    2002-307396    10/2002
(Continued)

OTHER PUBLICATIONS

International Search Report and Written Opinion for PCT App No. PCT/JP2014/005432 dated Nov. 25, 2014, 8 pgs.
(Continued)

*Primary Examiner* — Michael Lee
(74) *Attorney, Agent, or Firm* — Procopio, Cory, Hargreaves & Savitch LLP

(57) ABSTRACT

An image display device according to the exemplary embodiment includes: an RGB laser diode that outputs a light beam; a laser driver that drives the RGB laser diode based on input image data; a scanning mirror that scans the light beam by reflecting the light beam at an angle according to a drive voltage; and a scanner control unit that applies a bias voltage to the scanning mirror based on an angle with respect to a horizontal plane, or a static angle of the scanning mirror that is at a standstill when the drive voltage is not applied.

2 Claims, 13 Drawing Sheets

(52) U.S. Cl.
CPC ......... *H04N 9/3129* (2013.01); *H04N 9/3135* (2013.01); *H04N 9/3161* (2013.01)

(58) Field of Classification Search
USPC ........................................................ 348/745
See application file for complete search history.

(56) References Cited

U.S. PATENT DOCUMENTS

| | | | |
|---|---|---|---|
| 7,034,370 B2* | 4/2006 | Kuo .................. | G02B 26/0841 |
| | | | 235/454 |
| 2004/0099739 A1 | 5/2004 | Kuo et al. | |
| 2009/0128878 A1 | 5/2009 | Jun et al. | |
| 2011/0025813 A1* | 2/2011 | Suzuki ..................... | B41J 2/473 |
| | | | 347/224 |
| 2011/0141441 A1* | 6/2011 | Konno ............... | G02B 26/0841 |
| | | | 353/69 |
| 2015/0109586 A1* | 4/2015 | Masuda ............... | H04N 9/3129 |
| | | | 353/31 |

FOREIGN PATENT DOCUMENTS

| | | |
|---|---|---|
| JP | 2007-310196 | 11/2007 |
| JP | 2011-170658 | 9/2011 |
| JP | 2011-215324 A | 10/2011 |
| JP | 2012-198314 | 10/2012 |

OTHER PUBLICATIONS

European Search Report for EP App No. 14883402.1 dated Jan. 4, 2017.

* cited by examiner

IMAGE DISPLAY DEVICE AND IMAGE DISPLAY METHOD

CROSS REFERENCE TO RELATED APPLICATION

This application is based upon and claims the benefit of priority from PCT application No. PCT/JP2014/005432, filed Oct. 28, 2014 and Japanese patent application No. 2014-030126, filed on Feb. 20, 2014, the disclosure of which is incorporated herein in its entirety by reference.

BACKGROUND

The present invention relates to an image display device and an image display method.

A laser scanning type image display device that projects and displays images by reflecting and scanning laser light is known (for example, Japanese Unexamined Patent Application Publication No. 2007-310196 and Japanese Unexamined Patent Application Publication No. 2000-081589). The laser scanning type image display device is used as, for example, a HUD (Head Up Display) to project and display images on a windshield, a combiner, or the like of an automobile, or as a projector. In the laser scanning type image display device, laser light is reflected by a scanning mirror, and the direction of the reflecting surface of the scanning mirror is changed to the horizontal direction and the vertical direction, thereby scanning the laser light.

In an image display device disclosed in Japanese Unexamined Patent Application Publication No. 2007-310196, the center position of a projected image is shifted downward by applying a minus bias voltage to a drive voltage in the vertical direction of the scanning mirror.

An image display device disclosed in Japanese Unexamined Patent Application Publication No. 2000-081589 includes a Hall element that is provided on the back surface of the reflecting surface of a scanning mirror, and detects the angle of the reflecting surface based on a magnetic field intensity measured by the Hall element.

SUMMARY

When an image display device is placed on a horizontal plane, the normal of the reflecting surface of the scanning mirror which is at a standstill is supposed to be parallel to the horizontal plane. However, the reflecting surface of the scanning mirror is inclined due to the self-weight of the scanning mirror, even when the image display device is placed horizontally. Further, the inclination of the reflecting surface of the scanning mirror is changed according to the installation angle at which the image display device is placed. When the reflecting surface of the scanning mirror deviates from the position corresponding to a designed value, the projected image deviates from the position corresponding to the designed value.

When a bias voltage is applied to adjust the center of the projected image to the position corresponding to the designed value by the method disclosed in Japanese Unexamined Patent Application Publication No. 2007-310196, it is necessary to adjust the strength of the bias voltage of the individual products in the production step by visual observation. Thus, this adjustment requires a lot of time and labor, which results in an increase in cost. When the amount of deviation of the projected image from the position corresponding to the designed value varies due to a variation with time, it is difficult to make the above adjustment later.

An image display device according to the exemplary embodiment is an image display device including: a light source unit configured to output a light beam; a light source driving unit configured to drive the light source unit based on input image data; a scanning mirror configured to scan the light beam by reflecting the light beam at an angle according to a drive voltage; and a bias application unit configured to apply a bias voltage to the scanning mirror based on an angle of the image display device with respect to a horizontal plane, or a static angle of the scanning mirror that is at a standstill when the drive voltage is not applied.

An image display method according to the exemplary embodiment is an image display method for an image display device, the image display device including: a light source unit configured to output a light beam; a light source driving unit configured to drive the light source unit based on input image data; and a scanning mirror configured to scan the light beam by reflecting the light beam at an angle according to a drive voltage, the image display method including: obtaining an angle with respect to a horizontal plane, or a static angle of the scanning mirror that is at a standstill when the drive voltage is not applied; calculating a bias voltage to be added to the drive voltage based on the static angle or the angle with respect to the horizontal plane; and scanning the light beam by applying the drive voltage to the scanning mirror, the bias voltage being added to the drive voltage.

DETAILED DESCRIPTION

First Embodiment

Embodiments of the present invention will be described below with reference to the drawings.

Figure 1:
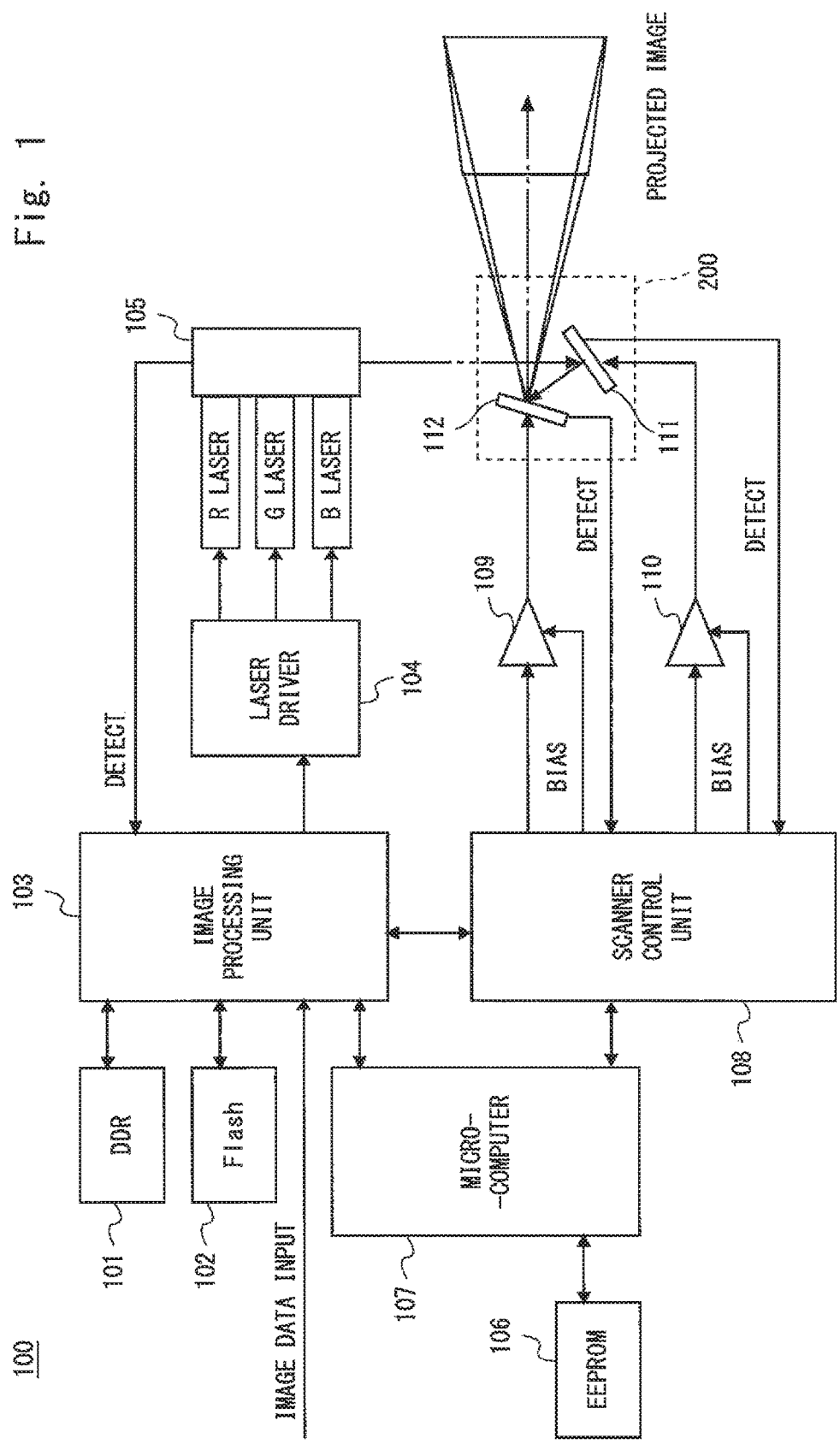
FIG. 1 is a block diagram showing a configuration of an image display device according to a first embodiment.

FIG. 1 is a block diagram showing a configuration of an image display device 100 according to this embodiment.

The image display device 100 includes a DDR (Double Data Rate) memory 101, a flash memory 102, an image processing unit 103, a laser driver 104, an RGB laser diode 105, an EEPROM (Electrically Erasable and Programmable Read Only Memory) 106, a microcomputer 107, a scanner control unit 108, a vertical scanner driver 109, a horizontal scanner driver 110, and a scanning mirror 200. The vertical direction of an image to be displayed is also referred to as a V (Vertical)-axis direction, and the horizontal direction of the image to be displayed is also referred to as an H (Horizontal)-axis direction.

The DDR memory 101 is a frame buffer that temporarily stores image data to be input to the image processing unit 103. The DDR memory 101 may be a DDR2, a DDR3, or other SDRAM.

The flash memory 102 is a non-volatile storage unit that stores data, programs, and the like necessary for operation of the image processing unit 103.

The image processing unit 103 performs processing, such as data sorting, on the image data received from the DDR memory 101, and outputs the image data to the laser driver 104 and the scanner control unit 108. The image processing unit 103 may be implemented by hardware such as an FPGA (Field Programmable Gate Array), or may be implemented by a program stored in the flash memory 102 and a CPU (Central Processing Unit).

The laser driver 104 drives the RGB laser diode 105 according to the input image data supplied from the image processing unit 103. The laser driver 104 is a light source driving unit that drives the RGB laser diode 105 based on the input image data at a timing determined by the image processing unit 103. The light source driving unit drives a light source unit based on the input image data.

The RGB laser diode 105 is driven by the laser driver 104 to emit laser light of three colors, i.e., red (R), green (G), and blue (B). The RGB laser diode 105 is the light source unit that outputs laser light beams. The RGB laser diode 105 controls the light emission intensity and light emission time of each color, thereby creating various colors used for projected images.

The microcomputer 107 generates a drive signal for causing the scanner control unit 108 to operate, and outputs the generated drive signal to the scanner control unit 108.

The EEPROM 106 is a non-volatile storage unit that stores data, programs, and the like necessary for operation of the scanner control unit 108.

The scanner control unit 108 controls the deflection angle, scanning frequency, and the like of the scanning mirror 200. The scanner control unit 108 generates a waveform of the drive voltage so that the scanning mirror 200 can obtain a desired deflection angle, frequency, and the like. The scanner control unit 108 may be implemented by hardware such as an FPGA, or may be implemented by a program stored in the flash memory 102 and a CPU.

The scanning mirror 200 scans a light beam by reflecting the light beam at an angle according to the drive voltage. The scanning mirror 200 includes a horizontal scanner 111 and a vertical scanner 112. The vertical scanner 112 scans the light beam in the vertical direction, and the horizontal scanner 111 scans the light beam in the horizontal direction.

The vertical scanner driver 109 causes the vertical scanner 112 to oscillate according to a vertical drive signal supplied from the image processing unit 103. The horizontal scanner driver 110 causes the horizontal scanner 111 to oscillate according to a horizontal drive signal supplied from the scanner control unit 108.

The vertical scanner 112 is an optical scanner that reflects laser light irradiated from the RGB laser diode 105, and oscillates based on a signal from the vertical scanner driver 109, thereby scanning the light beam in the vertical direction. The horizontal scanner 111 is an optical scanner that reflects laser light irradiated from the RGB laser diode 105, and oscillates based on a signal from the horizontal scanner driver 110, thereby scanning the light beam in the horizontal direction.

In this example, the horizontal scanner 111 reflects the laser light from the RGB laser diode 105, and the vertical scanner 112 further reflects the reflected light from the horizontal scanner 111, thereby displaying projected images on a projection surface. It can also be said that the vertical scanner 112 and the horizontal scanner 111 constitute an optical scanner that scans a laser beam in a reciprocating manner in the vertical direction and the horizontal direction. For example, the vertical scanner 112 and the horizontal scanner 111 may be formed into one 2-axis (two-dimensional) optical scanner. The vertical scanner 112 and the horizontal scanner 111 can use various systems such as a piezoelectric film system and a coil driving system.

Figure 2:
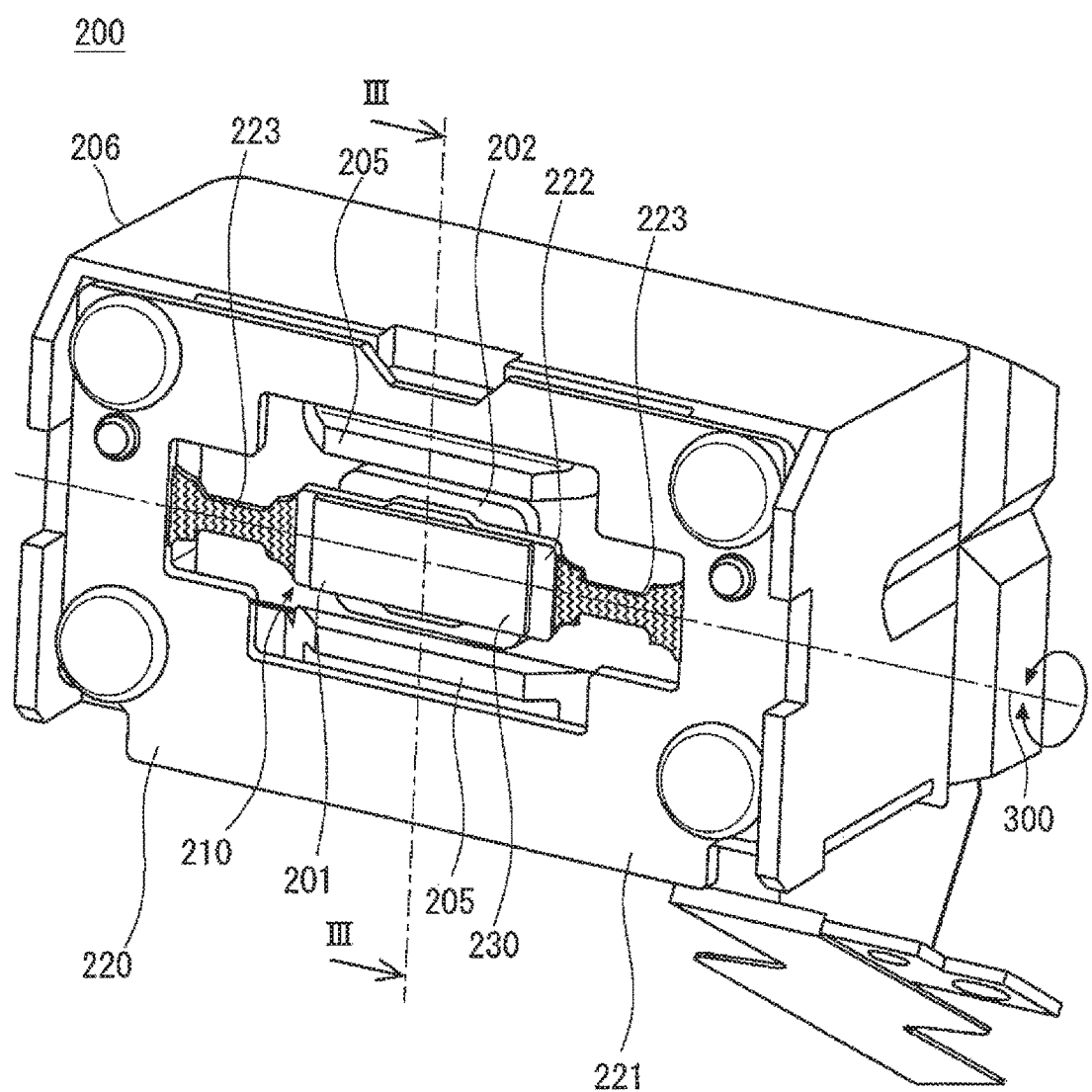
FIG. 2 is a perspective view showing a configuration of a scanning mirror of the image display device according to the first embodiment.
Figure 3:
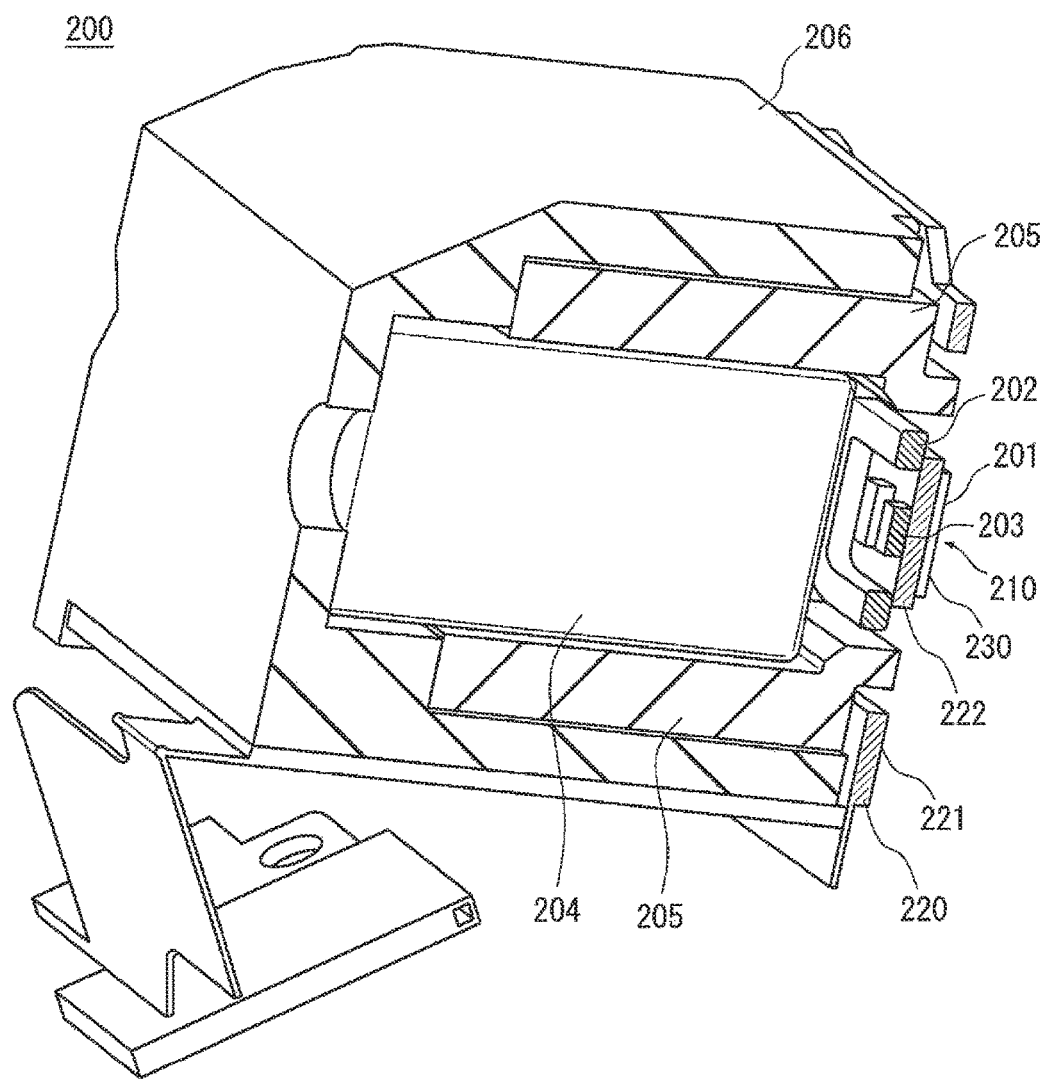
FIG. 3 is a sectional view showing the configuration of the scanning mirror of the image display device according to the first embodiment.
Figure 4:
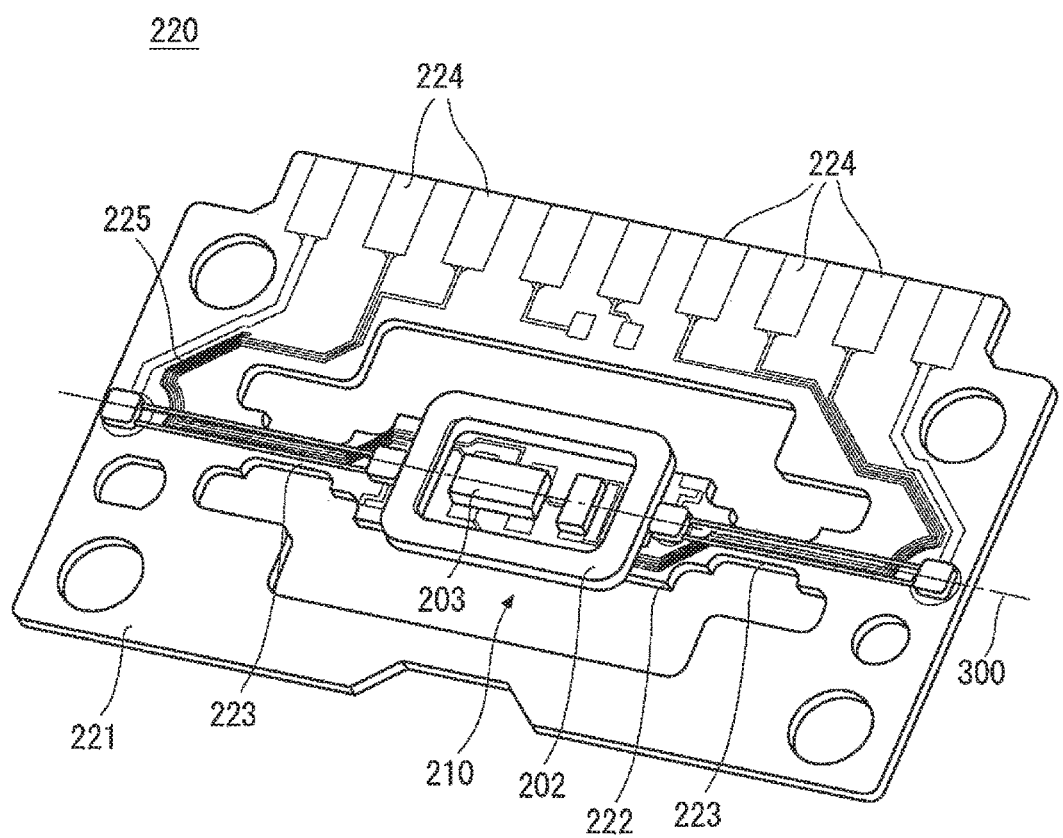
FIG. 4 is a perspective view showing a configuration of a back surface of an FPC board of the scanning mirror in the image display device according to the first embodiment.

Referring to FIGS. 2 to 4, the configuration of the scanning mirror 200 will be described. The scanning mirror 200 shown in FIGS. 2 to 4 is configured to be able to scan a light beam in one axis direction.

FIG. 2 is a perspective view showing the configuration of the scanning mirror 200 of the image display device 100. FIG. 2 shows a state of the scanning mirror 200 as viewed from the front side thereof. FIG. 3 is a sectional view showing the configuration of the scanning mirror 200 of the image display device 100. FIG. 4 is a perspective view showing the configuration of the back surface of the scanning mirror 200.

The scanning mirror 200 includes a case 206, an FPC (flexible printed circuits) board 220, a magnet 204, and a yoke 205.

As shown in FIG. 3, the magnet 204 and the yoke 205 are accommodated in the case 206. The magnet 204 generates a magnetic field. The yoke 205 is provided around the magnet 204. The yoke 205 allows the magnetic field generated by the magnet 204 to be concentrated on the periphery of a reflecting mirror 230. The front surface of the case 206 is provided with the FPC board 220.

As shown in FIG. 4, the FPC board 220 includes a frame unit 221, a base 222, a beam 223, terminals 224, and lines 225. The frame unit 221, the base 222, and the beam 223 are integrally formed. The base 222 is supported inside the frame unit 221 via the beam 223. The base 222 and the frame unit 221 may be reinforced by a backing such as a polyimide plate. The beam 223 is provided between the base 222 and the frame unit 221, and supports the base 222 in a swingable manner about the mirror rotation axis 300.

As shown in FIG. 3, the reflection mirror 230 is provided on the front surface of the base 222, and a driving coil 202 and a Hall element 203 are provided on the back surface of the base 222. The reflecting mirror 230 includes a reflecting surface 201 that reflects light. The driving coil 202 is provided so as to surround the Hall element 203. The reflecting mirror 230, the base 222, the driving coil 202, and the Hall element 203 constitute a mirror unit 210. In the mirror unit 210, the driving coil 202 is provided on the back surface of the base 222, so that the back surface side of the base 222 is heavier than the other side thereof. Accordingly, the base 222 is more likely to be inclined to the back surface side thereof due to gravity.

The terminals 224 and the lines 225 are each formed of a conductive member such as copper, and constitute a circuit to guide an electric signal from an external circuit to the driving coil 202, and a circuit to guide a detection signal from the Hall element 203 to the external circuit. The terminals 224 are each connected with the external circuit, and the electric signal input from each terminal 224 is output to the driving coil 202 through the corresponding line 225. The detection signal output from the Hall element 203 is output to the external circuit via the lines 225 and the terminals 224.

When a voltage is applied to the driving coil 202 from the scanner control unit 108, the driving coil 202 receives the Lorentz force from the magnetic field generated by the magnet 204. Thus, the orientation of the base 222 is changed according to the drive voltage, and the base 222 oscillates about the mirror rotation axis 300.

The Hall element 203 is provided on the back surface of the base 222 as shown in FIG. 4, and detects the magnetic field intensity of the magnet 204. The image display device 100 detects a static angle based on the magnetic field intensity detected by the Hall element 203. The Hall element 203 functions as a static angle detection unit. The term "static angle" refers to an angle of the scanning mirror 200 that is at a standstill when no drive voltage is applied.

Figure 5:
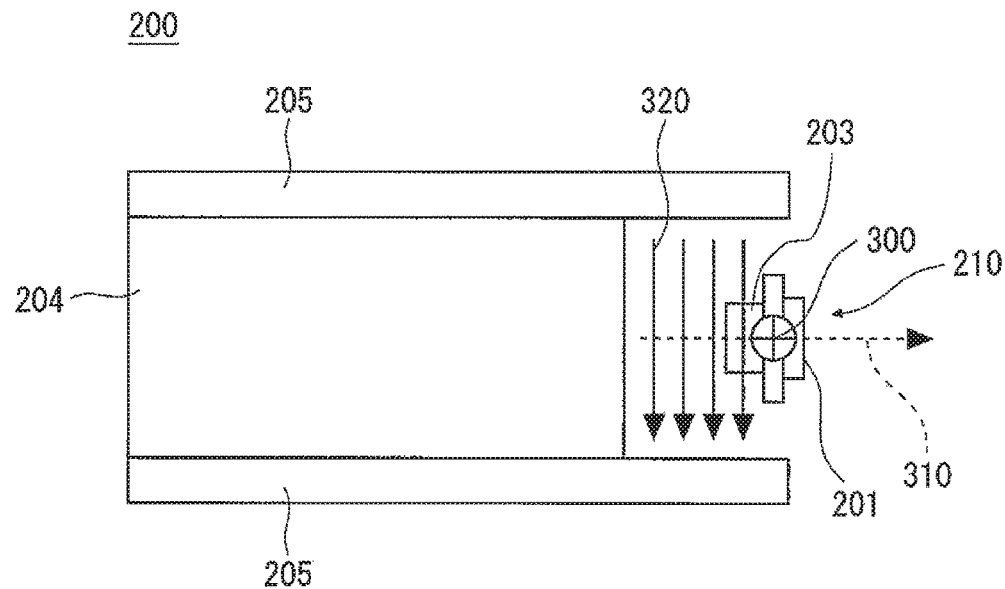
FIG. 5 is a diagram showing a state in which a reflecting surface of the scanning mirror is parallel to a magnetic field in the image display device according to the first embodiment.
Figure 6:
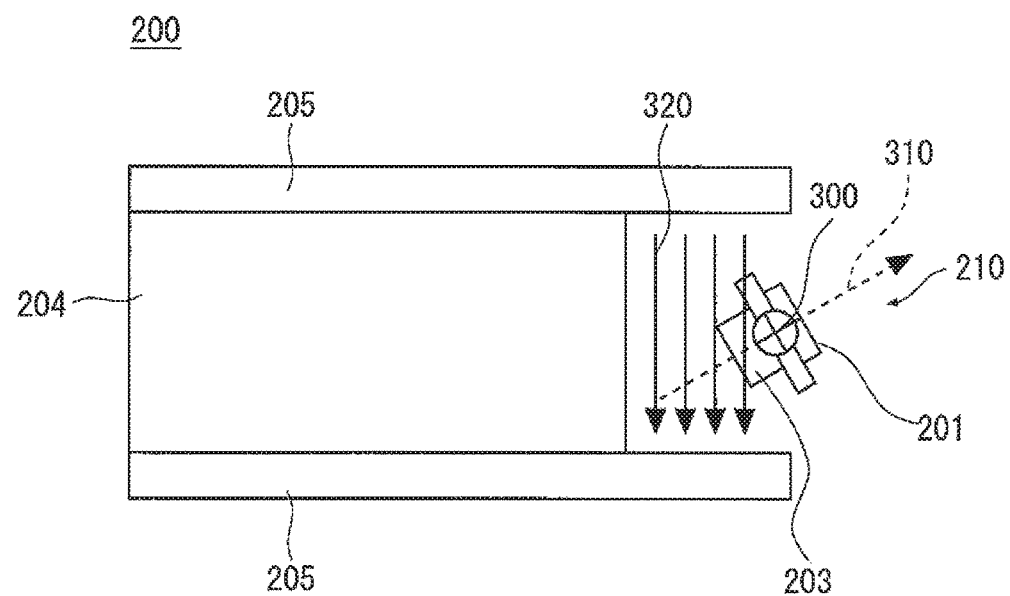
FIG. 6 is a diagram showing a state in which the reflecting surface of the scanning mirror has an angle with respect to the magnetic field in the image display device according to the first embodiment.
Figure 7:
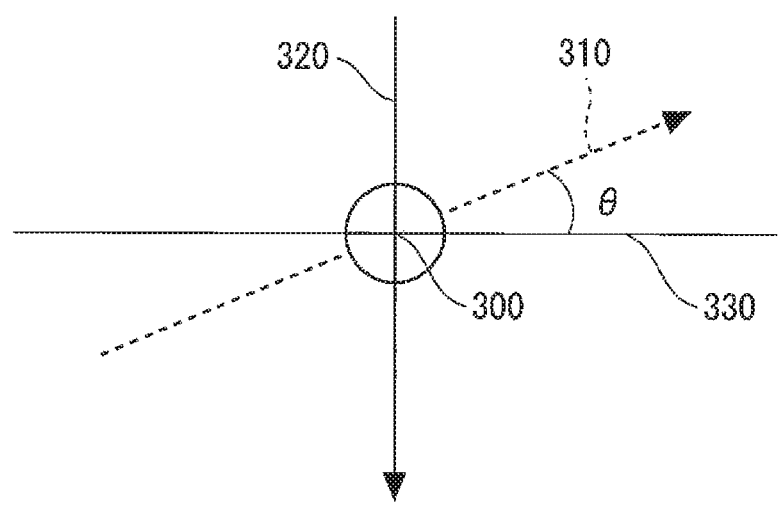
FIG. 7 is a diagram showing a state in which a magnetic field detection axis of a Hall element deviates from a state in which the magnetic field detection axis is perpendicular to the magnetic field in the image display device according to the first embodiment.

Referring to FIGS. 5 to 7, a mechanism in which the Hall element 203 detects the rotation angle of the scanning mirror 200 will be described.

As shown in FIG. 5, the yoke 205 is used to allow a magnetic field 320, which is generated by the magnet 204, to be concentrated on the mirror unit 210 of the scanning mirror 200. The mirror unit 210 oscillates about the mirror rotation axis 300. The mirror unit 210 includes the reflecting surface 201 and the Hall element 203 which is provided on the side of the mirror unit 210 opposite to the side thereof that the reflecting surface 201 is provided on. The Hall element 203 can detect the magnetic field in the normal direction of the detection surface thereof. Referring to FIG. 5, a magnetic field detection axis 310 of the Hall element 203 faces rightward in the drawing sheet, and the magnetic field detection axis 310 and the magnetic field 320 are perpendicular to each other. Accordingly, the magnetic field detected by the Hall element 203 is zero.

As shown in FIG. 6, when the mirror unit 210 is rotated and the reflecting surface 201 is inclined upward, the angle formed between the magnetic field detection axis 310 of the Hall element 203 and the magnetic field 320 deviates from the state shown in FIG. 5.

As shown in FIG. 7, when the angle formed between an axis 330, which is perpendicular to the magnetic field 320, and the magnetic field detection axis 310 is θ(°), an output voltage Vh (V) of the Hall element is calculated as Vh=K·Ih·B·sin θ, where the magnetic flux density is represented by B (T); the Hall current is represented by Ih (A); and the coefficient is represented by K (V·A$^{-1}$·T$^{-1}$).

The scanner control unit 108 adds a bias voltage based on the static angle detected by the Hall element 203 to the drive voltage. In the image display device 100, the scanner control unit 108 functions as a bias application unit that applies a bias voltage. The scanner control unit 108 may apply a bias voltage to the scanning mirror 200 based on the static angle of the scanning mirror 200 that is at a standstill when no drive voltage is applied, or based on an angle with respect to a horizontal plane. The term "angle with respect to a horizontal plane" used herein refers to an angle which is formed between the horizontal plane and the central axis of the reflecting surface of the scanning mirror 200 and which is generally determined by an installation angle at which the image display device 100 is placed. As shown in FIG. 7, when the angle formed between the axis 330 perpendicular to the magnetic field 320 and the magnetic field detection axis 310 is θ(°), a bias voltage Vb (V) is calculated as Vb=θ/K, where the drive sensitivity of the scanning mirror 200 is represented by K (°/V).

Figure 8:
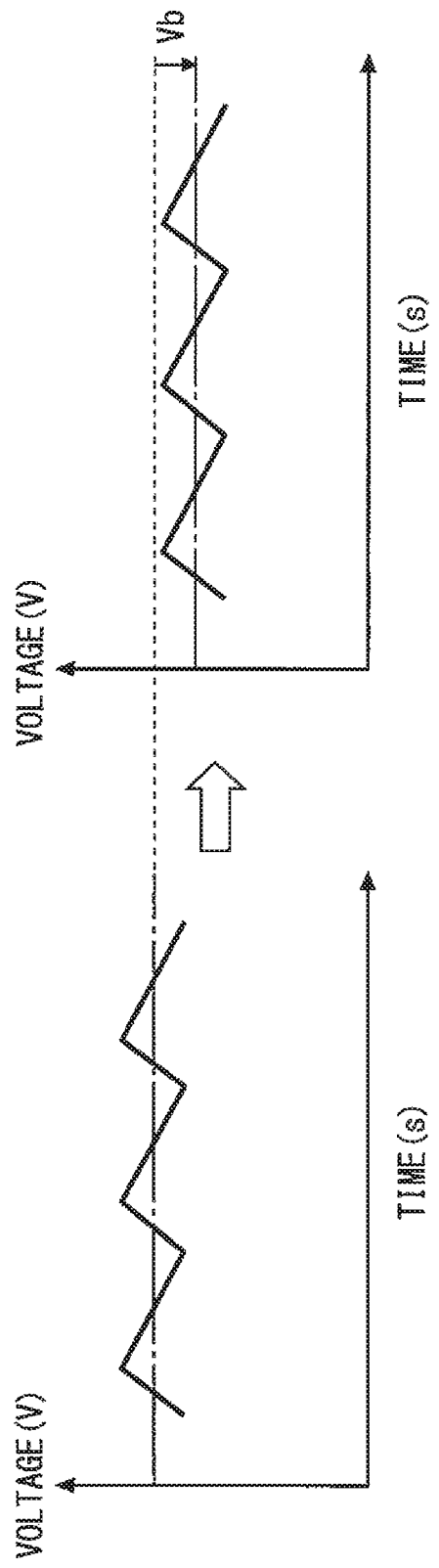
FIGS. 8(a) and 8(b) are graphs showing a change in drive voltage before and after the application of a bias voltage in the image display device according to the first embodiment.

FIG. 8 is graph showing a change in drive voltage before and after the application of a bias voltage. FIG. 8(a) shows a drive voltage before the application of the bias voltage, and FIG. 8(b) shows a drive voltage after the application of the bias voltage. FIG. 8(b) shows that the drive voltage is reduced by an amount corresponding to the bias voltage Vb in comparison with FIG. 8(a).

The bias voltage may have a negative polarity or a positive polarity. For example, a sine wave, a ramp waveform, or the like may be used as the waveform of the drive voltage.

Figure 9:
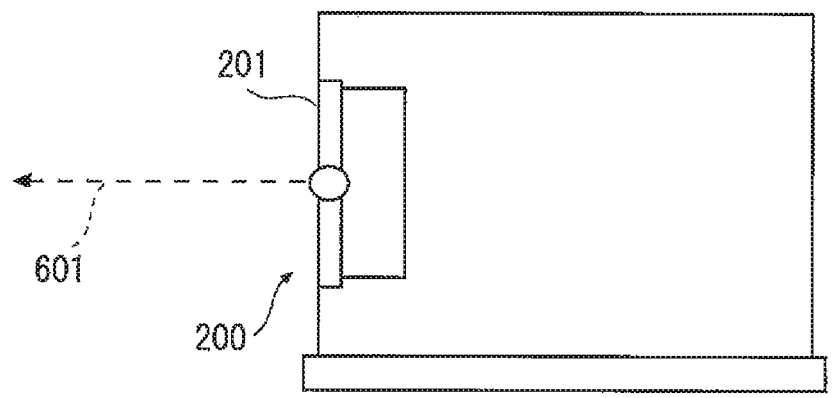
FIG. 9 is a diagram showing the orientation of the reflecting surface placed at a position corresponding to a designed value in the image display device according to the first embodiment.
Figure 10:
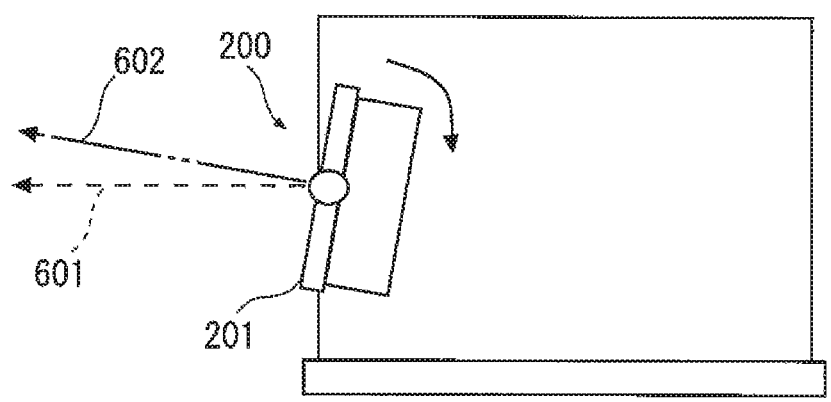
FIG. 10 is a diagram showing a state in which the orientation of the reflecting surface deviates from the position corresponding to the designed value in the image display device according to the first embodiment.

When the image display device 100 is placed in such a manner that a mechanical central axis 601 of the scanning mirror 200 is parallel to the horizontal plane, the normal of the reflecting surface 201 of the stopped scanning mirror 200 is supposed to be parallel to the horizontal plane as shown in FIG. 9. The mechanical central axis 601 is an axis representing the designed position at the center in the longitudinal direction of a projected image projected by the image display device 100. However, since the driving coil 202 is provided on the back surface of the base opposite to the side thereof that the reflecting surface 201 is provided on in the scanning mirror 200, the back surface side thereof is heavier than the other side thereof. Accordingly, as shown in FIG. 10, the reflecting surface 201 of the scanning mirror 200 is inclined due to gravity even when the image display device 100 is placed in such a manner that the mechanical central axis 601 is parallel to the horizontal plane. The normal located at the center of the reflecting surface 201 at this time is defined as a reflecting surface central axis 602.

Figure 11:
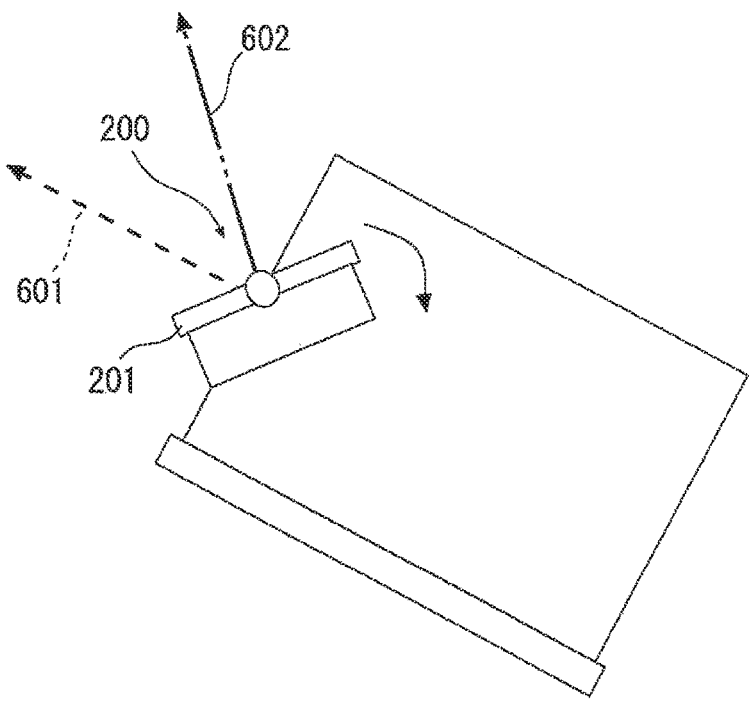
FIG. 11 is a diagram showing the orientation of the reflecting surface when the image display device according to the first embodiment is placed in such a manner that the image display device is inclined upward.
Figure 12:
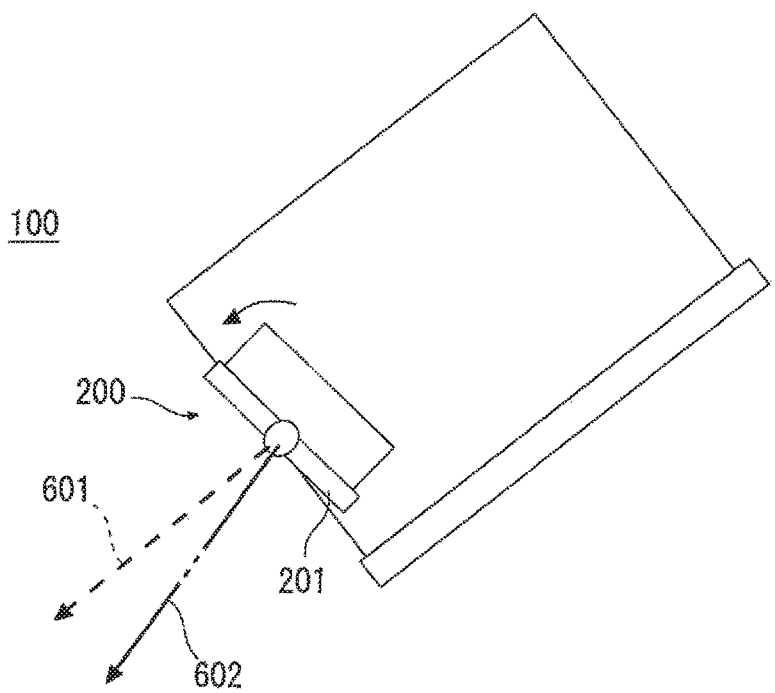
FIG. 12 is a diagram showing the orientation of the reflecting surface when the image display device according to the first embodiment is placed in such a manner that the image display device is inclined downward.

The image display device 100 cannot be always placed in such a manner that the reflecting surface central axis 602 of the scanning mirror 200 is parallel to the horizontal plane. In some cases, placing the image display device 100 on an inclined installation surface is unavoidable. As shown in FIG. 11, when the image display device 100 is placed in such a manner that the side of the image display device 100 that outputs laser light is inclined upward, the reflecting surface central axis 602 of the scanning mirror 200 is inclined further upward. As shown in FIG. 12, when the image display device 100 is placed in such a manner that the side of the image display device 100 that outputs laser light is inclined downward, the reflecting surface central axis 602 of the scanning mirror 200 is inclined further downward. Thus, the inclination of the reflecting surface 201 of the scanning mirror 200 varies depending on the installation conditions of the image display device 100.

Figure 13:
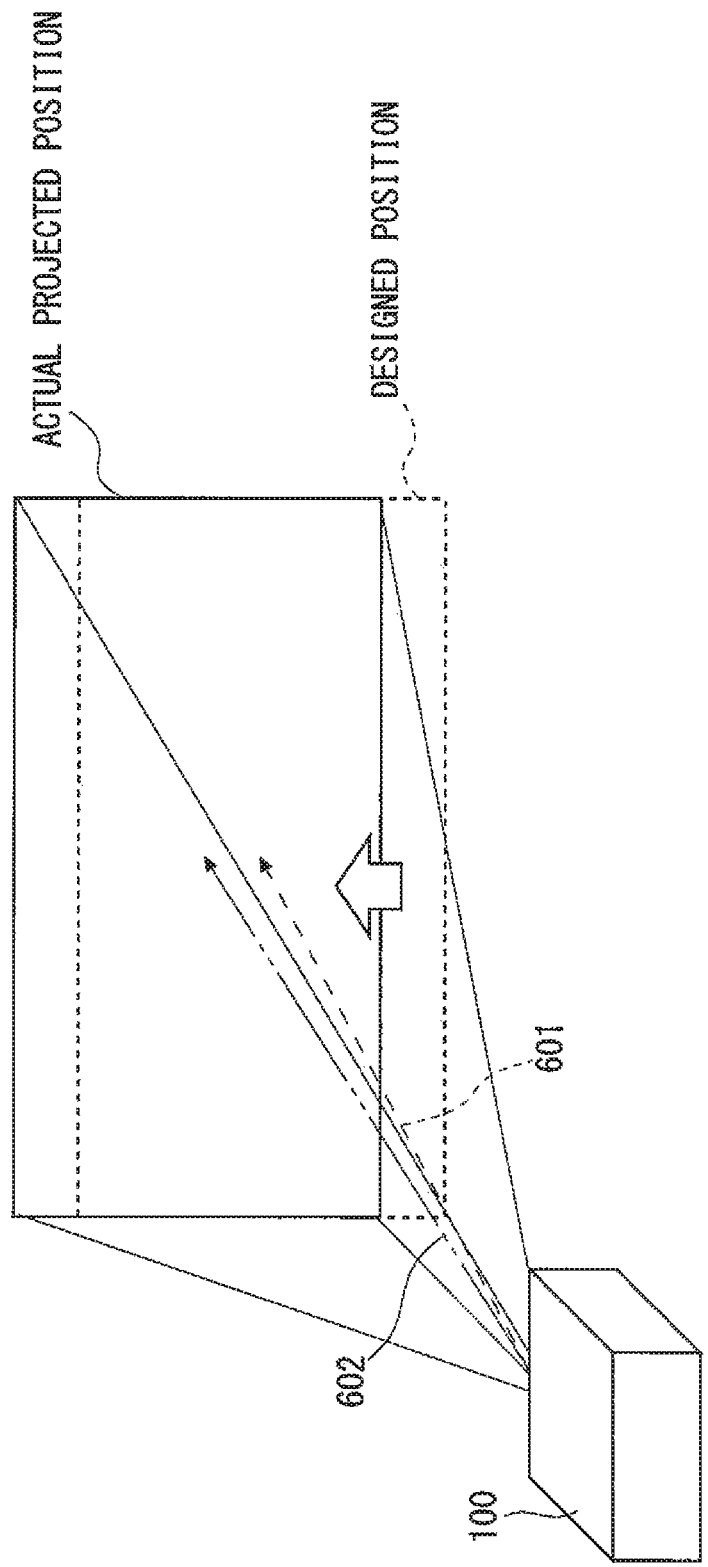
FIG. 13 is a diagram for explaining a deviation of a projected image in the image display device according to the first embodiment.

When the reflecting surface central axis 602 of the scanning mirror 200 is inclined upward from the mechanical central axis 601, as shown in FIG. 13, the projected image deviates upward from the designed position. This deviation of the projected image varies depending on the individual image display device 100, and the amount of deviation due to a variation with time also varies depending on the individual image display device 100.

An image display method for the image display device 100 to correct a deviation of the projected image from the designed position as shown in FIG. 13 will be described.

Figure 14:
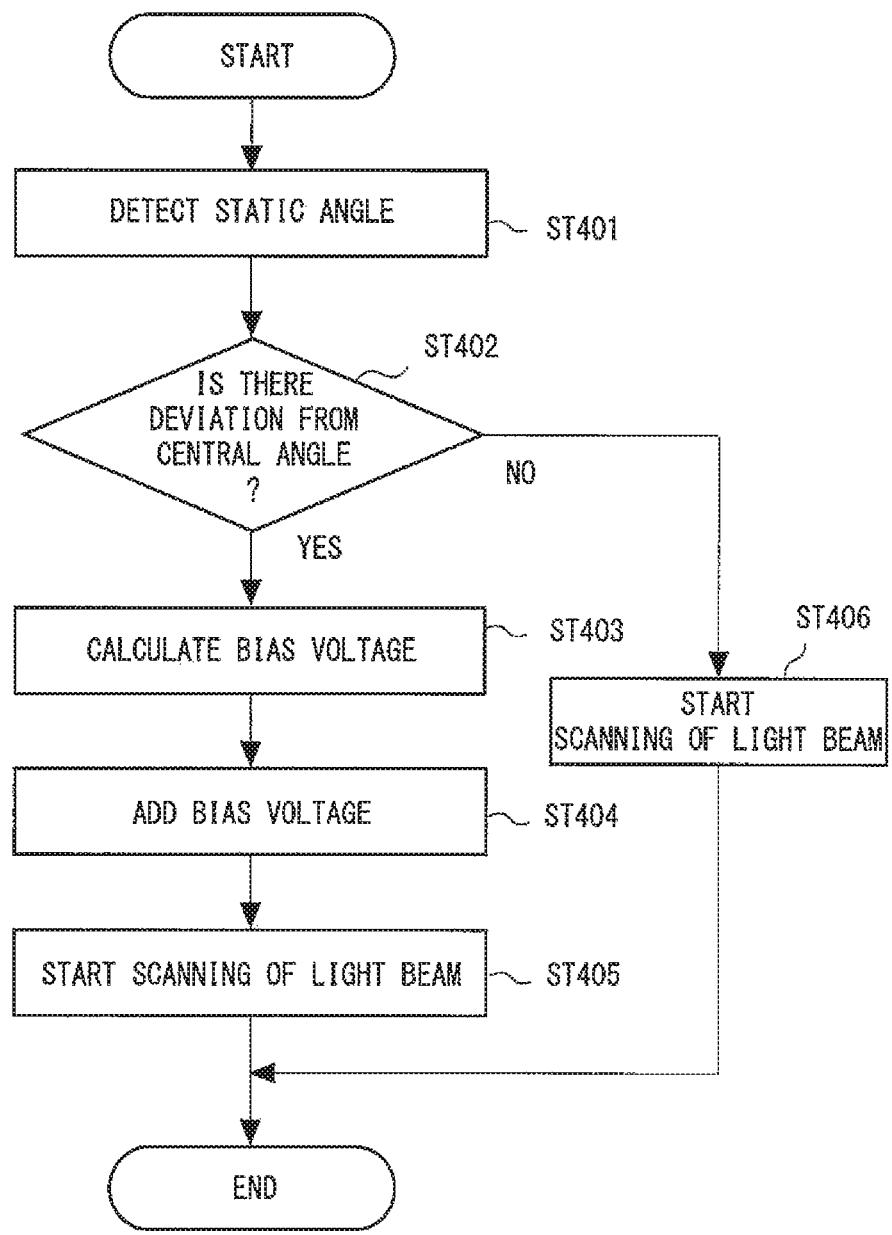
FIG. 14 is a flowchart showing an image display method according to the first embodiment.

FIG. 14 is a flowchart showing the image display method using the image display device 100.

The Hall element 203 detects the static angle of the scanning mirror 200 that is at a standstill when no drive voltage is applied (ST401).

Next, it is determined whether the static angle detected by the Hall element 203 deviates from a central angle at which the reflecting surface 201 is vertical to the mechanical central axis 601 (ST402). When the static angle does not deviate from the central angle (NO in ST402), the scanning mirror 200 starts scanning of a light beam (ST406). When the static angle deviates from the central angle (YES in ST402), the bias voltage to be added to the drive voltage is calculated based on the detected static angle (ST403).

Next, the scanner control unit 108 adds the calculated bias voltage to the drive voltage (ST404).

Next, the scanner control unit 108 applies the drive voltage to which the bias voltage is added to the scanning mirror 200, thereby allowing scanning of the laser beam (ST405).

A step of checking whether the reflecting surface 201 of the scanning mirror 200 is matched with the central angle by the bias voltage based on the detection signal from the scanning mirror 200 may be added after the application of the bias voltage.

The image display device 100 according to this embodiment is capable of detecting an inclination of the reflecting surface 201 in the static state of the scanning mirror 200 by using the Hall element 203, calculating the bias voltage necessary for correcting the inclination, and adding the drive voltage to which the bias voltage is added to the scanning mirror. Thus, when an image is projected, the image display device 100 can adjust the center position of the projected image to the designed position.

Second Embodiment

Figure 15:
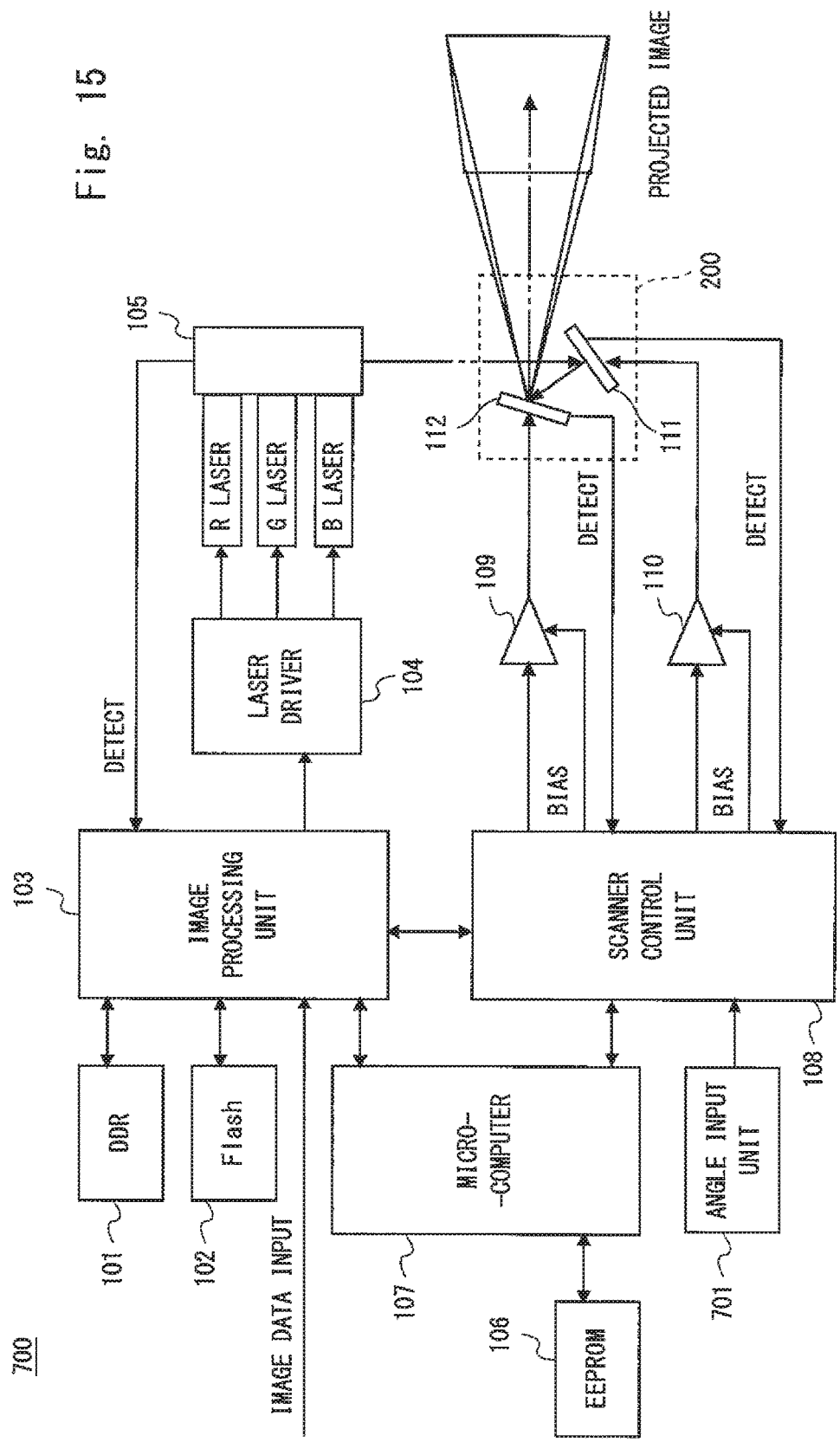
FIG. 15 is a block diagram showing a configuration of an image display device according to a second embodiment.

An image display device 700 according to this embodiment will be described with reference to FIG. 15.

The image display device 700 differs from the image display device 100 in that the image display device 700 includes an angle input unit 701.

An angle which is formed between the horizontal plane and the reflecting surface central axis 601 of the scanning mirror 200 and which is formed due to the installation angle of the image display device 700 is input to the angle input unit 701. The angle of the image display device 700 that is formed between the horizontal plane and the reflecting surface central axis 601 is measured by an angle measuring instrument and input to the angle input unit 701 before the image display device 700 is used. Alternatively, the angle formed between the horizontal plane and the reflecting surface central axis 601 that is associated with the input installation angle of the image display device 700 may be input to the angle input unit 701.

The flash memory 102 stores an angle-bias voltage table representing the relationship between the angle with respect to the horizontal plane and the strength of the bias voltage. The angle-bias voltage table is a table indicating bias voltages of various magnitudes to be used for correcting the position of a projected image to the designed position when the angle formed between the horizontal plane and the reflecting surface central axis 601 of the scanning mirror 200 is a certain angle.

The scanner control unit 108 adds the bias voltage to the drive voltage based on the angle input to the angle input unit 701 and the angle-bias voltage table.

In the image display device 700, the position of a projected image can be corrected without the need for obtaining the static angle of the reflecting surface 201 of the scanning mirror 200. Accordingly, since there is no need for the scanning mirror 200 to be provided with an angle sensor, such as the Hall element 203, a reduction in the cost of the scanning mirror 200 can be achieved.

Third Embodiment

Figure 16:
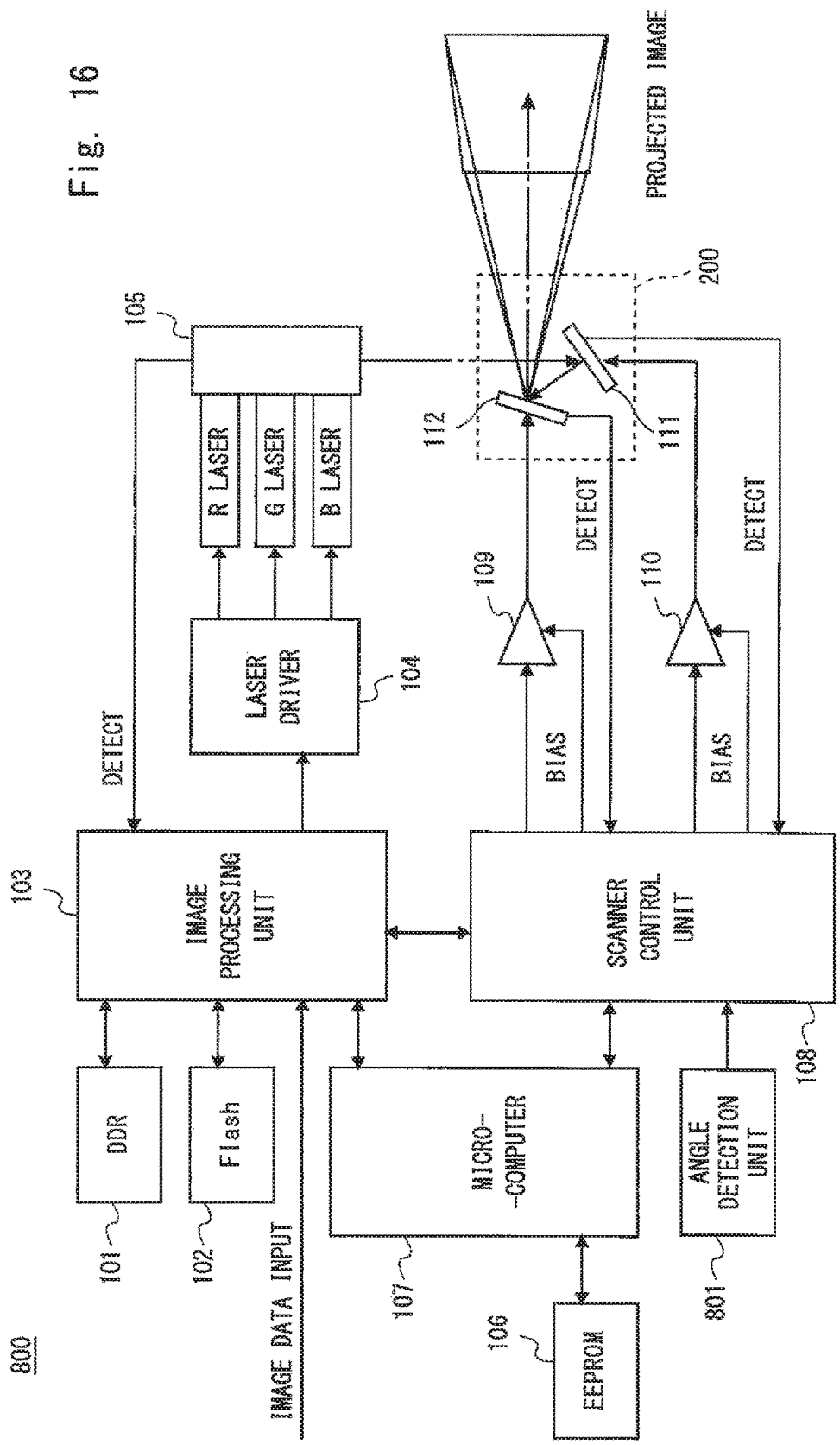
FIG. 16 is a block diagram showing a configuration of an image display device according to a third embodiment.

An image display device 800 according to this embodiment will be described with reference to FIG. 16.

The image display device 800 differs from the image display device 100 according to the first embodiment in that the image display device 800 includes an angle detection unit 801.

The angle detection unit 801 detects an angle which is formed between the horizontal plane and the reflecting surface central axis 601 of the scanning mirror 200 and which is formed due to the installation angle of the image display device 800. An angle sensor such as a gyroscope is used as the angle detection unit 801. The angle detection unit 801 detects, for example, the installation angle of the image display device 800, and detects the angle formed between the horizontal plane and the reflecting surface central axis 601 of the scanning mirror 200 based on the detected installation angle.

The flash memory 102 stores an angle-bias voltage table representing the relationship between the angle and the strength of the bias voltage.

The scanner control unit 108 adds the bias voltage to the drive voltage based on the angle detected by the angle detection unit 801 and the angle-bias voltage table.

In the image display device 800, the position of a projected image can be corrected without the need for obtaining the statistic angle of the reflecting surface 201 of the scanning mirror 200. Accordingly, since there is no need for the scanning mirror 200 to be provided with an angle sensor, such as the Hall element 203, a reduction in the cost of the scanning mirror 200 can be achieved. Unlike the image display device 700 according to the second embodiment, the image display device 800 detects by itself the angle with respect to the horizontal plane, without the need for measuring the angle with respect to the horizontal plane of the image display device 800 in advance, thereby facilitating the correction of the center position of the projected image.

The present invention is not limited to the embodiments described above, and can be modified as necessary without departing from the scope of the invention. For example, concerning the deviation from the central angle of the scanning mirror 200, the vertical scanner 112 is described above as an example, but the horizontal scanner 111 can also adjust the center position of a projected image in a manner similar to that of the vertical scanner.

What is claimed is:

1. An image display device comprising:
   a light source unit configured to output a light beam;
   a light source driving unit configured to drive the light source unit based on input image data;
   a scanning mirror configured to scan the light beam by reflecting the light beam at an angle according to a drive voltage;
   a static angle detection unit configured to detect a static angle of the scanning mirror that is at a standstill when the drive voltage is not applied;
   a bias application unit configured to apply a bias voltage to the scanning mirror based on the static angle;
   a driving coil that is provided on a back surface of a reflecting surface of the scanning mirror and configured to change an orientation of the reflecting surface according to the drive voltage; and
   a magnet configured to generate a magnetic field around the driving coil,
   wherein the static angle detection unit includes a Hall element that is provided on the back surface of the reflecting surface of the scanning mirror and configured to detect a magnetic field intensity of the magnet,
   the static angle detection unit detects the static angle based on the magnetic field intensity detected by the Hall element, and
   the bias application unit adds a bias voltage to the drive voltage, the bias voltage being based on the static angle detected by the static angle detection unit.

2. An image display method for an image display device, the image display device comprising:
   a light source unit configured to output a light beam;
   a light source driving unit configured to drive the light source unit based on input image data;
   a scanning mirror configured to scan the light beam by reflecting the light beam at an angle according to a drive voltage;
   a driving coil that is provided on a back surface of a reflecting surface of the scanning mirror and configured to change an orientation of the reflecting surface according to the drive voltage;
   a magnet configured to generate a magnetic field around the driving coil; and
   a Hall element that is provided on the back surface of the reflecting surface of the scanning mirror and configured to detect a magnetic field intensity of the magnet,
   the image display method comprising:
      detecting a static angle of the scanning mirror that is at a standstill when the drive voltage is not applied based on the magnetic field intensity detected by the Hall element;
      calculating a bias voltage to be added to the drive voltage based on the static angle; and
      scanning the light beam by applying the drive voltage to the scanning mirror, the bias voltage being added to the drive voltage.

* * * * *